(12) United States Patent
Strizki et al.

(10) Patent No.: US 7,540,892 B2
(45) Date of Patent: Jun. 2, 2009

(54) HYDROGEN GAS GENERATION SYSTEM

(75) Inventors: Michael Strizki, Hopewell, NJ (US);
Richard M. Mohring, East Brunswick, NJ (US)

(73) Assignee: Millennium Cell Inc., Eatontown, NJ (US)

( * ) Notice: Subject to any disclaimer, the term of this patent is extended or adjusted under 35 U.S.C. 154(b) by 276 days.

(21) Appl. No.: 11/471,582

(22) Filed: Jun. 21, 2006

(65) Prior Publication Data

US 2006/0236606 A1 Oct. 26, 2006

Related U.S. Application Data

(63) Continuation of application No. 10/359,104, filed on Feb. 5, 2003, now Pat. No. 7,105,033.

(51) Int. Cl.
*B01J 7/00* (2006.01)

(52) U.S. Cl. .............. 48/61; 48/198.8; 48/67; 48/127.9; 422/112; 422/236; 422/242; 422/188; 422/198; 429/30; 429/46; 423/289

(58) Field of Classification Search .......... 422/198, 422/306, 236, 242, 211; 429/17, 19; 48/61
See application file for complete search history.

(56) References Cited

U.S. PATENT DOCUMENTS

| | | | |
|---|---|---|---|
| 2,534,533 A | 12/1950 | Schlesinger et al. | |
| 3,210,157 A | 10/1965 | Lewis, Jr. et al. | |
| 6,250,078 B1 | 6/2001 | Amendola et al. | |
| 6,348,278 B1 * | 2/2002 | LaPierre et al. | 429/17 |
| 6,433,129 B1 | 8/2002 | Amendola et al. | |
| 6,468,694 B1 | 10/2002 | Amendola et al. | |
| 6,497,973 B1 | 12/2002 | Amendola et al. | |
| 6,524,542 B2 | 2/2003 | Amendola et al. | |
| 6,544,400 B2 | 4/2003 | Hockaday et al. | |
| 6,544,679 B1 | 4/2003 | Petillo et al. | |
| 6,924,054 B2 | 8/2005 | Prasad et al. | |
| 7,105,033 B2 * | 9/2006 | Strizki et al. | 48/61 |
| 2003/0037487 A1 | 2/2003 | Amendola et al. | |
| 2003/0118145 A1 | 6/2003 | Faris et al. | |

FOREIGN PATENT DOCUMENTS

| | | |
|---|---|---|
| EP | 1 170 249 A1 | 1/2002 |
| EP | 1 375 419 A2 | 1/2004 |
| WO | WO 01/51410 | 7/2001 |
| WO | WO 03/004145 A1 | 1/2003 |

OTHER PUBLICATIONS

Maurice E. Indig and Richard N. Snyder, "Sodium Borohydride, an Interesting Anodic Fuel." Journal of the Electrochemical Society, vol. 109, pp. 1104-1106, Nov. 1962.

* cited by examiner

*Primary Examiner*—Alexa D. Neckel
*Assistant Examiner*—Kaity V. Handal
(74) *Attorney, Agent, or Firm*—Dickstein Shapiro LLP

(57) ABSTRACT

A system for generating hydrogen gas utilizes a volume exchange housing for the storage of a fuel material that reacts to generate hydrogen gas and a hydrogen separation chamber. The system includes a gas permeable membrane or membranes that allow hydrogen gas to pass through the membrane while preventing aqueous solutions from passing therethrough. The system is orientation independent. A throttle valve is also used to self regulate the reaction generating the hydrogen gas.

34 Claims, 2 Drawing Sheets

HYDROGEN GAS GENERATION SYSTEM

CROSS-REFERENCE TO RELATED APPLICATIONS

This application is a continuation of U.S. patent application Ser. No. 10/359,104, filed on Feb. 5, 2003, now U.S. Pat. No. 7,105,033, which is incorporated herein by reference in its entirety.

FIELD OF THE INVENTION

The invention relates to a system for generating hydrogen gas using a catalyst from a fuel such as borohydride. More particularly, the invention relates to a system for hydrogen generation having a volume-exchange system for the storage of fuel solution and discharged product and a hydrogen filtration system.

BACKGROUND OF THE INVENTION

Hydrogen is a "clean fuel" because it can be reacted with oxygen in hydrogen-consuming devices, such as a fuel cell or combustion engine, to produce energy and water. Virtually no other reaction byproducts are produced in the exhaust. As a result, the use of hydrogen as a fuel effectively solves many environmental problems associated with the use of petroleum based fuels. Safe and efficient storage of hydrogen gas is, therefore, essential for many applications that can use hydrogen. In particular, minimizing volume, weight and complexity of the hydrogen storage systems are important factors in mobile applications.

The development of fuel cells as replacements for batteries in portable electronic devices, including many popular consumer electronics such as personal data assistants, cellular phones and laptop computers is dependent on finding a convenient and safe hydrogen source. The technology to create small-scale systems for hydrogen supply, storage and delivery has not yet matched the advancements in miniaturization achieved with fuel cells.

A hydrogen fuel cell for small applications needs to be compact and lightweight, have a high gravimetric hydrogen storage density, and be operable in any orientation. Additionally, it should be easy to match the control of the system's hydrogen flow rate and pressure to the operating demands of the fuel cell.

The existing hydrogen storage options, which include compressed and liquid hydrogen, hydrided metal alloys, and carbon nanotubes, have characteristics which complicate their use in small consumer applications. For instance, compressed hydrogen and liquid hydrogen require heavy tanks and regulators for storage and delivery, metal hydrides require added heat to release their stored hydrogen, and carbon nanotubes must be kept pressurized.

Alternatives for hydrogen storage and generation include the class of compounds known as chemical hydrides, such as the alkali metal hydrides, the alkali metal aluminum hydrides and the alkali metal borohydrides. The hydrolysis reactions of many complex metal hydrides, including sodium borohydride, ($NaBH_4$) have been commonly used for the generation of hydrogen gas.

In those applications where a steady and constant supply of hydrogen is required, it is possible to construct hydrogen generation apparatus that control the contact of a catalyst with the hydride fuel. Such generators typically use a two-tank system, one for fuel and the other for discharged product. The hydrogen generation reaction occurs in a third chamber that contains a metal catalyst and connects the two tanks. However, such two-tank designs are not typically directionally independent or amenable to miniaturization.

An object of the present invention is to provide a portable hydrogen generator that incorporates a volume-exchange tank for the storage of the fuel solution and the discharged product and includes a hydrogen filtration system. This device is orientation independent and compact. Further, such a generator can utilize a throttle valve that will enable the generator to self-regulate fuel flow and hydrogen production.

SUMMARY OF THE INVENTION

In U.S. patent application Ser. No. 09/902,900 entitled "Differential Pressure Driven Borohydride Based Generator, filed Jul. 11, 2001, and owned by the present assignee, the content of which is hereby incorporated herein by reference into the present application in its entirety, a single volume exchanging tank is incorporated into a hydrogen generator as part of a fuel reservoir to feed the active fuel chamber. As fuel is consumed from the fuel area and borate solution is returned to the borate solution area, the movable partition slides such that space that was originally occupied by fuel becomes occupied by borate solution. This has the obvious advantage of reducing the overall volume needed to store both fuel and borate solution. As the hydrolysis reaction of chemical hydride is exothermic, the borate solution is usually discharged at a higher temperature than the fuel solution; the movable partition can be designed as a heat insulator to prevent heat exchange between the two regions. This design does not, however, provide for orientation independent operation.

The metal hydride fuel component of the disclosed system is a complex metal hydride that is water soluble and stable in aqueous solution. Examples of suitable metal hydrides are those having the general formula $MBH_4$ where M is an alkali or alkaline earth metal selected from Group 1 or Group 2 of the periodic table, such as lithium, sodium, potassium, calcium and magnesium. Examples of such compounds include, without limitation, $NaBH_4$, $LiBH_4$, $KBH_4$, $Ca(BH_4)_2$ and $Mg(BH_4)_2$. These metal hydrides may be utilized in mixtures, but are preferable utilized individually. Preferred for such systems in accordance with the present invention is sodium borohydride ($NaBH_4$). Sodium borohydride can be dissolved in alkaline water solutions with virtually no reaction and the aqueous SBH fuel solutions are nonvolatile and will not burn. This imparts handling and transport ease both in the bulk sense and within the hydrogen generator itself.

A borohydride compound will react with water to produce hydrogen gas and a borate in accordance with the following chemical reaction:

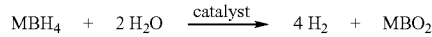

$$MBH_4 + 2H_2O \xrightarrow{catalyst} 4H_2 + MBO_2$$

where $MBH_4$ and $MBO_2$, respectively, represent a metal borohydride and a metal metaborate. The rate of decomposition of the metal borohydride into hydrogen gas and a metal metaborate is pH dependent, with higher pH values hindering the hydrolysis. Accordingly, a stabilizer (such as sodium hydroxide ($NaOH$)) is typically added to solutions of a complex metal hydride (such as sodium borohydride) in water to be used as the fuel from which the hydrogen gas is generated.

As the hydrolysis of sodium borohydride is typically slow at room temperature, heat or a catalyst, e.g. acids or a variety of transition metals, can be used to accelerate the hydrolysis reaction. Transition metals from the nickel, cobalt and iron families generally show the highest activity, and the metals or the corresponding metal salts or metal borides can be used in solution or as suspensions, or such salts, borides or metals can be supported on inert substrates. In the embodiments present here, a solid catalyst, either as a solid metal or metal boride or as deposited on a substrate, is contained within the catalyst chamber.

A process for generating hydrogen from such a stabilized metal hydride solution is described in U.S. patent application Ser. No. 09/979,362, file Jan. 7, 2000 entitled "A System For Hydrogen Generation" and the content of that application is hereby incorporated herein by reference in its entirety.

Resulting products of the hydrogen generation process can include hydrogen gas, borate and water among other things. It can be appreciated that the specific dimensions as well as operating temperatures and pressures of the system can be modified and adapted according to the intended use of the system and according to the specific metal hydride solution to be used without departing from the intended purpose of the invention.

Thus the present invention includes a hydrogen gas generation system with a housing having a hydrogen separation chamber and fuel storage chamber and where either or both of those chambers may include a gas permeable member to pass hydrogen through the membrane. As another feature of the present invention, there is a volume exchanging container having a fuel storage chamber and a hydrogen separation chamber and either or both of those chambers may have a gas permeable membrane located therein. As still another feature, there may be a fuel container for containing the fuel material and which may have a gas permeable membrane located therein to separate any hydrogen gas from this material.

DETAILED DESCRIPTION OF THE PREFERRED EMBODIMENTS

Figure 1:
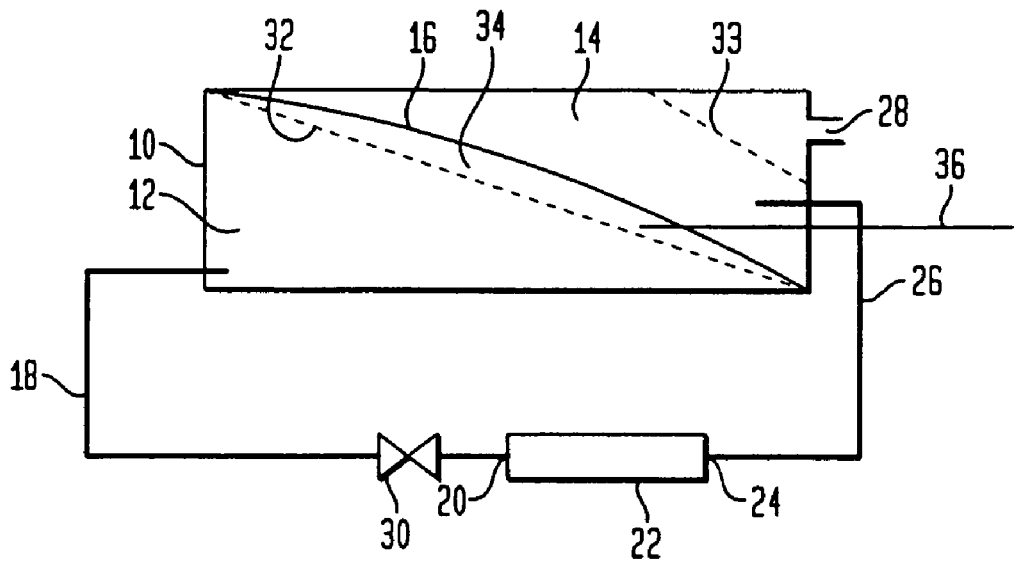
FIG. 1 is a schematic illustration of an arrangement for a hydrogen gas generation system in accordance with the invention.

In an embodiment of the invention shown in FIG. 1, the hydrogen gas generation system includes a housing 10 which can be constructed of a relatively strong material as is necessary to carry out the purposes of the present invention. Within the housing 10 there is formed a fuel storage chamber 12 and a hydrogen separation chamber 14 separated by a flexible partition 16. The fuel storage chamber 12 normally contains the fuel solution that is reactive to produce hydrogen gas and is a hydride solution and can be a stabilized metal hydride solution, such as sodium borohydride.

The flexible partition 16 can be a ribbon spring or a preformed piece of flexible plastic or similar material that has an intrinsic tension and can maintain an applied pressure on the fuel solution within the fuel storage chamber 12. When the fuel storage chamber 12 is full of the fuel solution, the flexible partition 16 is expanded into a high energy "extended" state. As the flexible partition 16 contracts as the fuel solution is depleted, the flexible partition 16 returns to its lowest energy "original" state, it compresses the fuel solution and forces that fuel solution out of the fuel storage chamber and into the fuel conduit 18.

The fuel conduit 18 conducts the fuel solution from the fuel storage chamber 12 to an inlet 20 in the catalyst chamber 22 which contains the catalyst to enhance the reaction of the fuel solution to produce hydrogen gas. The catalyst used with this embodiment can comprise various catalysts known to be useful for the present application and can be ruthenium metal deposited on a metal mesh prepared as described in PCT Publication No. WO 01/51410 and entitled "System For Hydrogen Generation".

The reaction results in the generation of hydrogen gas along with the formation of other materials such as borate and water and which shall simply be referred to as discharged fuel. That discharged fuel along with hydrogen thereby produced leaves the catalyst chamber 22 via an outlet 24 and passes through an outlet conduit 26 where the discharged fuel and hydrogen enters the hydrogen separation chamber 14. Within the hydrogen separation chamber 14, the hydrogen gas separates from the discharged fuel and passes upwardly to exit from the hydrogen separation chamber 14 through the hydrogen gas outlet 28 where the hydrogen is collected and channeled to an end use device to derive the energy from the hydrogen gas.

A fuel shut off valve 30 may be present in the fuel conduit 18 to act to shut off and/or control the flow of fuel solution passing from the fuel storage chamber 12 to the catalyst chamber 22 and impart manual or automated control over the production of hydrogen gas.

There is also a first gas permeable membrane 32 located in the fuel storage chamber 12 in the upper area thereof and which allows hydrogen gas to pass through the gas permeable membrane 32 while preventing the fuel solution from passing therethrough. Examples of suitable gas permeable membranes include those materials known to be more permeable to hydrogen than water such as silicon rubber, fluoropolymers or any of the common hydrogen-permeable metal membranes such as palladium-gold alloys.

Accordingly, any hydrogen gas that is produced spontaneously in the fuel solution while it is present and at rest in the fuel storage chamber 12 due to the reaction of the fuel solution, and that hydrogen gas passes through the gas permeable membrane 32 and enters the space 34 where that hydrogen gas can be drawn off via a discharge conduit 36 and/or the hydrogen gas can be allowed to pass through pores or other openings in or around the flexible partition 16 to enter the hydrogen separation chamber 14 and continue to progress upwardly to join and exit the hydrogen separation chamber 14 along with the hydrogen gas normally produced by the reaction of the fuel solution by the reaction that takes place within the catalyst chamber 22 and which enters the hydrogen separation chamber 14 by means of the outlet conduit 26.

A second gas permeable membrane 33 is also preferably located in the hydrogen separation chamber 14 to allow the hydrogen in that chamber to pass through the second gas permeable membrane 33 and outwardly through the hydrogen gas outlet 28 while preventing any of the discharged fuel from passing therethrough such that the discharged fuel is contained within the hydrogen separation chamber 14 so that the hydrogen gas can be recovered through the hydrogen gas outlet 28 for use with the end utilization device.

The gaseous hydrogen is separated from the discharged fuel by means of gravity in the hydrogen separation chamber 14 and the gaseous hydrogen leaves the hydrogen separation chamber 14 through the second gas permeable membrane 33 and the hydrogen gas outlet 28 for use in supplying energy to an end utilization device, such as a fuel cell in a laptop computer or a cell phone.

As such, in the operation of the hydrogen gas generating system, the flexible partition 16 exerts a force within the fuel storage chamber 12 to initialize the reaction by forcing the fuel solution through the catalyst chamber 22 to produce the hydrogen gas and the discharged fuel. The discharged fuel enters the hydrogen separation chamber 14 and the discharged fuel adds weight to the flexible partition 16 to continue to force the fuel solution outwardly from the fuel storage chamber 12 through the catalyst chamber 22 as the production of hydrogen gas continues.

Figure 2:
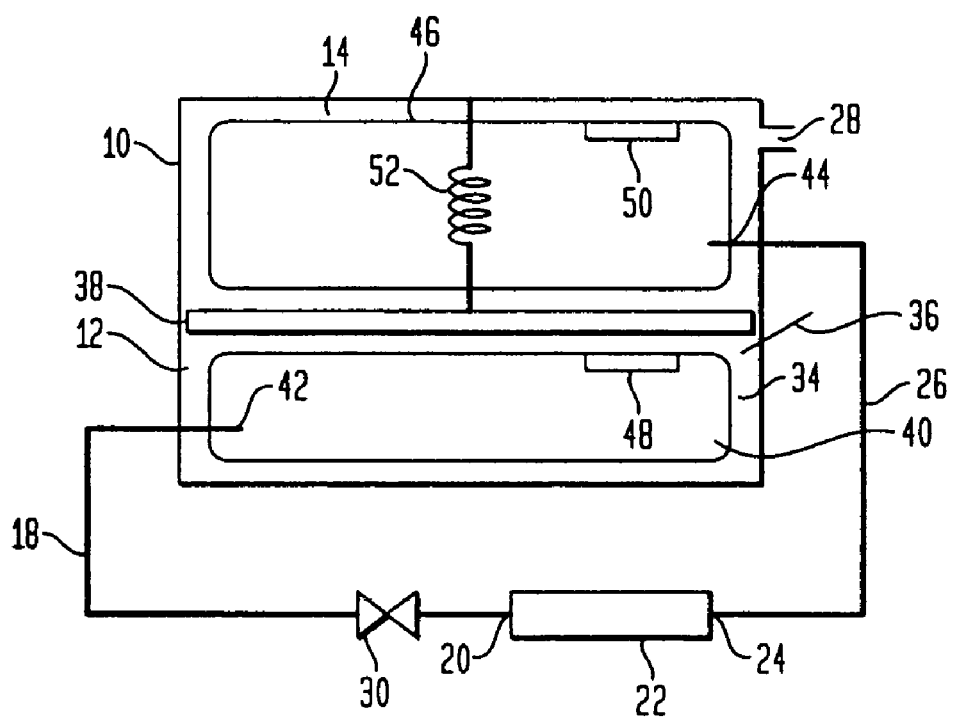
FIG. 2 is a schematic illustration of an alternative embodiment of a hydrogen gas generation system.

In another embodiment of the invention shown in the schematic illustration of FIG. 2, the housing 10 also has formed therein a fuel storage chamber 12 and a hydrogen separation chamber 14. In the FIG. 2 embodiment there is a movable partition 38 that is located intermediate the fuel storage chamber 12 and the hydrogen separation chamber 14 and which is movably positioned within the housing 10. Within the fuel storage chamber 12, there is first flexible bag 40 comprised of a plastic material, such as nylon, and which contains the fuel solution that is discharged via an outlet 42 in the first flexible bag 40 so that the fuel solution can enter the fuel conduit 18 and the catalyst chamber 22 where the reaction takes place and the discharged fuel along with hydrogen gas passes through the outlet conduit 26 where it enters a inlet 44 in a second flexible bag 46. The second flexible bag 46 is also preferably made of a plastic material, such as nylon.

In the walls of each of the first and second flexible bags 40, 46, there is located first and second gas permeable membrane windows 48, 50, respectively, so that hydrogen can readily pass through the walls of the first and second bags 40, 46 in a manner and for a purpose to be described.

As a further feature of the FIG. 2 embodiment, the movable partition 38 is biased toward the first flexible bag 40 in order to create and maintain a pressure within the first flexible bag 40 to push the fuel solution within the first flexible bag 40 outwardly through the fuel conduit 18 and thus through the catalyst chamber 22 in the operation of the gas generating system. As shown in FIG. 2, that bias may be created by a spring 52 that is located between the housing 10 and the movable partition 38 so that the spring 52 can create the bias on the movable partition 38. Obviously, other means can be used to create a bias on the movable partition 38 to urge it in the direction of the first flexible bag 40 to expel the fuel solution out of the first flexible bag 40 to operate the gas generating system of the present invention.

Returning now to the first and second gas permeable membrane windows 48, 50, the first gas permeable membrane window 48 is formed in the wall of the first flexible bag that contains the fuel solution and, as explained, there is formed a quantity of outgassed hydrogen spontaneously caused by the presence of the fuel solution within the first flexible envelope 40 and therefore, that out gas hydrogen can pass through the first gas permeable membrane window 48 to pass out of the first flexible bag 40 to enter the space 34 bounded by the interior of housing 10 and the exterior of first flexible bag 40 and second flexible bag 46. That outgassed hydrogen can then be allowed to pass through openings in or around the movable partition 38 to pass outwardly through the hydrogen outlet 28, or, alternatively, be removed by means of a separate discharge conduit 36 for use to provide power to the particular end use device.

In a similar manner, the second gas permeable membrane window 50 formed in the wall of the second flexible bag 46 allows the hydrogen generated by the reaction that takes place in the catalyst chamber 22 to pass through the wall of the second flexible bag 46 so that such hydrogen gas can pass through the hydrogen gas outlet 28 and, again, to exit the housing 10 for use in powering some end use device.

In the operation of the FIG. 2 embodiment, therefore, the bias of the spring 52 causes the movable partition 38 to push against the first flexible bag 40 to expel the fuel solution out of the first flexible bag 40 and into the fuel conduit 18 to pass through the catalyst chamber 22 to enhance the reaction of the fuel solution to generate hydrogen gas that ultimately passes out of the housing 10 through the hydrogen gas outlet 28. As shown in FIG. 2, the bias is exerted by the spring 52, however, the movable partition 38 could be driven by any device that applies a force to compress the fuel such as a spring-loaded plate, gas-charged pistons or wafer springs. As the second flexible bag 46 fills with the discharged fuel, it can exert additional pressure on the movable partition 38 in some orientations to further forcing additional fuel into the catalyst chamber 22.

As an example, the hydrogen gas generating system of FIG. 2 was constructed from a plastic gastight box fitted with a hydrogen gas outlet valve and tested experimentally. The hydrogen gas outlet 28 was connected to a 50 watt fuel cell with a 24 watt load. To begin testing, an empty bag, the second flexible bag 46, constructed of layers of nylon and polypropylene with a fluoropolymer membrane was placed in the hydrogen separation chamber 14 and connected to a bulkhead fitting that extended through the wall of the housing 10 to connect the second flexible bag 46 to the outlet conduit 26 from the catalyst chamber 22.

Another bag, the first flexible bag 40, was filled with an aqueous solution of sodium borohydride and placed in the housing 10 and occupied the majority of the fuel storage chamber 12 and compressed the spring loaded movable partition 38. That compression created a constant pressure on the first flexible bag 40 forcing the fuel to flow through the outlet 42. The first flexible bag 40 was connected by a series of valves, including a check valve, a ball valve, a solenoid valve and a needle valve to the inlet 20 of the catalyst chamber 22 which was located outside the housing 10. The spring loaded movable partition 38 maintained a positive pressure on the first flexible bag 40.

The fuel shut-off valve 30 was opened to allow the fuel to flow from the first flexible bag 40 through the catalyst chamber 22 to produce hydrogen and mixture of sodium borate in water. This valve 30 can be manually powered or powered by a DC power module. The borate and hydrogen were discharged from the catalyst chamber 22 into the empty second flexible bag 46. The hydrogen gas, but none of the borate or liquid water, passed through the second gas permeable membrane window 50 into the interior of the housing 10, while retaining the borate and water in the second flexible bag 46. The second gas permeable membrane window 50 prevented the large solid particles from reaching the fuel cell as such particles were retained within the second flexible bag 46.

A pressure switch was used to regulate the pressure of hydrogen within the housing 10 to prevent over-pressurization. When the pressure reached a pre-set limit, a solenoid valve was operated to shut off the flow of fuel to the catalyst chamber 22 and halt the production of hydrogen. When hydrogen was removed from the housing 10, the solenoid valve was operated to resume the flow of fuel and hydrogen production. The hydrogen gas generator maintained a hydrogen pressure between about 2 and 5 psi. and acceptable load following was observed.

Figure 3:
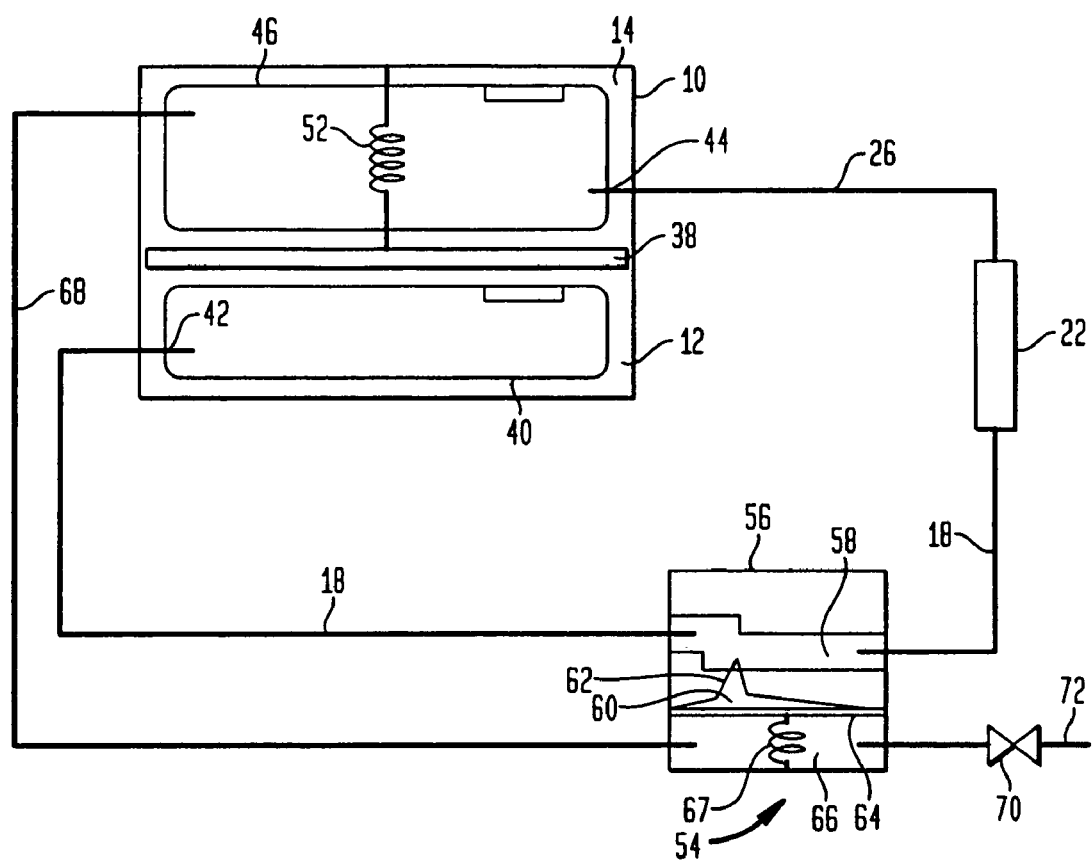
FIG. 3 is a schematic illustration of a still further embodiment of a hydrogen gas generation system in accordance with the present invention.

Turning now to FIG. 3, there is a schematic illustration of a further embodiment of the present invention and where there is a throttle valve 54 interposed in the fuel conduit 18 to control the reaction carried out in the catalyst chamber 22.

As with the FIG. 2 embodiment, therefore, the housing 10 encloses a fuel storage chamber 12 and a hydrogen separation chamber 14 separated by a movable partition 38. Again the movable partition 38, by means of the spring 52, is pressurized so as to propel the fuel solution through the fuel conduit 18 and thereafter through the catalyst chamber 22 where hydrogen gas is produced and the hydrogen gas along with the discharged fuel passes through the outlet conduit 26 to the interior of the second flexible bag 46 where the hydrogen gas is separated by gravity to pass through the hydrogen gas outlet 28 and into a control pressure conduit 56.

In the FIG. 3 embodiment, however, the throttle valve 54 is used to control the reaction that takes place in the catalyst chamber 22 by controlling the flow of fuel solution from the first flexible bag 40 to the catalyst chamber 22 and comprises a valve body 56 having a passageway 58 therethrough. The fuel passes through the passageway 58 as it progresses through the fuel conduit 18 and, therefore, by controlling the cross sectional area of the passageway 58 it is possible to control the flow of the fuel solution that reaches the catalyst chamber 22 and thus, also control the reaction that takes place in the catalyst chamber 22

Accordingly, there is a valve operator 60 having a tapered leading edge 62 that enters the passageway 58 such that the movement of the valve operator 60 with respect to the passageway 58 can control the flow of the fuel solution passing through the passageway 58 by creating a variable orifice. The movement of the valve operator 60 is, in turn controlled by a diaphragm 64 and a pressure chamber 66 such that a change in pressure causes movement of the valve operator 60. A spring 67 can also be employed to increase the sensitivity of the throttle valve 54.

The pressure in the pressure chamber 66 is established by the hydrogen that passes outwardly from the hydrogen gas outlet 28 through a hydrogen conduit 68. As can be seen in FIG. 3, the hydrogen conduit 68 communicates with the pressure chamber 66 and there is a back pressure control valve 70 located on the downstream side of the pressure chamber 66.

The operation of the throttle valve 54 can now be described for controlling the reaction that takes place in the catalyst chamber 22. Once the reaction has been commenced by the fuel solution being forced through the catalyst chamber 22 by the pressure within the first flexible bag 40, hydrogen gas is produced that passes out of the hydrogen gas outlet 28 and through the hydrogen conduit 68 to ultimately pass out of a downstream hydrogen outlet 72.

As the hydrogen gas passes through the pressure chamber 66, there is a pressure established, controlled by the back pressure control valve 70, such that the pressure in the pressure chamber 66, and thus the position of the valve operator 60 is controlled by the hydrogen passing through the hydrogen conduit 68. The reaction that takes place in the catalyst chamber 22 is therefore self-regulating, that is, as the reaction increases, additional hydrogen is produced and increases the flow of hydrogen in the hydrogen conduit 68, thereby raising the pressure within the pressure chamber 66 to force the leading edge 62 of the valve operator 60 further into obstructing the passageway 58, or narrowing the orifice, carrying the fuel solution such that the reduction in that flow of fuel solution slows the reaction that takes place in the catalyst chamber 22. As a result, the amount of hydrogen produced is reduced. The same regulation takes place as the reaction slows in the catalyst chamber 22 and the production of hydrogen is reduced, that is, the effective area of the passageway 58 is then increased, thereby increasing the flow of the fuel solution and increasing the reaction within the catalyst chamber 22.

As such, the reaction within the catalyst chamber 22 is regulated by the use of the throttle valve 54 and the reaction further established by regulating the flow of the product hydrogen converted to pressure by the back pressure valve 70.

The foregoing description has been presented to enable those skilled in the art to more clearly understand and practice the instant invention. It should not be considered as limitations upon the scope of the invention, but as merely being illustrative and representative of several embodiments of the invention. Numerous modifications and alternative embodiments of the invention will be apparent to those skilled in the art in view of the foregoing description. For example, while the membranes 32, 33, 48 and 50 have been described as being gas permeable so as to isolate the hydrogen gas from the fuel material or discharged fuel. Many membrane materials that are permeable to hydrogen gas are also hydrophobic. In certain applications, it is preferable for the membrane to be hydrophobic in addition to being gas permeable.

We claim:

1. A hydrogen generator comprising:
   a fuel storage chamber configured to contain a fuel material capable of reacting to generate hydrogen gas;
   a hydrogen separation chamber; and
   a catalyst chamber configured to contain a catalyst capable of promoting reaction of the fuel material to generate hydrogen gas and discharged fuel;
   wherein the catalyst chamber is in fluid communication with the fuel storage chamber and the hydrogen separation chamber such that the fuel material can exit the fuel storage chamber and enter the catalyst chamber, and the hydrogen gas and discharged fuel can exit the catalyst chamber and enter the hydrogen separation chamber;
   and wherein the fuel storage chamber has a gas permeable membrane capable of allowing hydrogen gas to pass from the chamber while preventing the fuel material from passing therethrough.

2. The hydrogen generator of claim 1, wherein the hydrogen separation chamber has a gas permeable membrane.

3. The hydrogen generator of claim 1, further comprising an outer housing and wherein both of the fuel storage chamber and the hydrogen separation chamber are within the housing.

4. The hydrogen generator of claim 3, further comprising a partition within the housing and wherein the fuel storage chamber and the hydrogen separation chamber are separated from each other by the partition.

5. The hydrogen generator of claim 3, further comprising at least a first hydrogen gas outlet, proximate the hydrogen separation chamber, for discharging hydrogen gas from the housing.

6. The hydrogen generator of claim 5, further comprising a second hydrogen gas outlet, proximate the fuel storage chamber.

7. The hydrogen generator of claim 4, wherein the partition is flexible.

8. The hydrogen generator of claim 4 wherein the partition is configured to allow hydrogen gas from the gas permeable membrane in the fuel storage chamber to combine with hydrogen gas from the hydrogen separation chamber in a space between at least one of the fuel storage chamber or the hydrogen separation chamber and the housing.

9. The hydrogen generator of claim 8, further comprising a hydrogen gas outlet configured to pass the combined hydrogen gas out of the housing.

10. The hydrogen generator of claim 1, wherein the fuel storage chamber and the hydrogen separation chamber are located in a housing and are separated from each other by a movable partition.

11. The hydrogen generator of claim 1, wherein the fuel storage chamber comprises a first flexible bag for containing the fuel material and the hydrogen separation chamber comprises a second flexible bag for containing the discharged fuel.

12. The hydrogen generator of claim 11, wherein the at least one gas permeable membrane is located in a wall of at least one of the flexible bags.

13. The hydrogen generator of claim 11, wherein the at least one gas permeable membrane is located in a wall of at least one of the flexible bags.

14. The hydrogen generator of claim 12, wherein each of the flexible bags comprises a wall having a gas permeable membrane.

15. A hydrogen gas generator, comprising
a housing containing a fuel storage area and a hydrogen separation area, wherein each area is bounded by at least one wall comprising a hydrogen permeable membrane configured to permit hydrogen gas to pass through the respective wall;
at least a first hydrogen gas outlet configured to pass hydrogen gas from the housing;
a reaction chamber;
a fuel conduit capable of conveying fuel from the fuel storage area to the reaction chamber;
a discharged fuel conduit capable of conveying discharged fuel and hydrogen gas from the reaction chamber to the hydrogen separation area.

16. The hydrogen gas generator of claim 15, wherein the hydrogen permeable membrane comprises a material selected from the group consisting of silicon rubber, fluoropolymers, and hydrogen permeable metals.

17. The hydrogen generator of claim 15, wherein at least one of the hydrogen separation and fuel storage areas is bounded by a flexible bag.

18. The hydrogen generator of claim 17, wherein each of the areas is bounded by a flexible bag.

19. The hydrogen generator of claim 17, wherein the respective areas are located side by side within the housing.

20. The hydrogen generator of claim 15, wherein the respective areas are separated by a movable partition within the housing.

21. The hydrogen gas generator of claim 20, wherein the partition is flexible.

22. The hydrogen gas generator of claim 20, wherein the partition is configured such that hydrogen gas can pass from one side of the partition within the housing to the other side of the partition.

23. The hydrogen generator of claim 15, further comprising a space between at least one of the areas and the housing, wherein the space is capable of containing hydrogen gas from at least one of the respective areas before the gas passes through the hydrogen gas outlet.

24. The hydrogen generator of claim 15, further comprising a space between at least one of the areas and the housing, wherein the space is capable of containing hydrogen gas from both of the respective areas before the gas passes through the hydrogen gas outlet.

25. The hydrogen generator of claim 15, wherein the reaction chamber comprises a supported catalyst capable of enhancing the generation of hydrogen from fuel stored in the fuel storage area.

26. A hydrogen gas generator comprising:
a housing containing a fuel storage area and a hydrogen separation area, wherein each area is bounded by at least one wall comprising a hydrogen permeable membrane configured to permit hydrogen gas to pass through the respective wall and wherein each area is separated by a movable partition within the housing, wherein the partition is configured such that hydrogen gas can pass from one side of the partition within the housing to the other side of the partition;
at least a first hydrogen gas outlet configured to pass hydrogen gas from the housing;
a reaction chamber;
a fuel conduit capable of conveying fuel from the fuel storage area to the reaction chamber; and
a discharged fuel conduit capable of conveying discharged fuel and hydrogen gas from the reaction chamber to the hydrogen separation area.

27. The hydrogen gas generator of claim 26, wherein the partition comprises a gas permeable membrane.

28. The hydrogen gas generator of claim 27, wherein the hydrogen permeable membrane comprises a material selected from the group consisting of silicon rubber, fluoropolymers, and hydrogen permeable metals.

29. The hydrogen gas generator of claim 26, wherein the partition comprises a hydrogen gas permeable material.

30. A hydrogen gas generator comprising:
a housing containing a fuel storage area and a hydrogen separation area, wherein each area is bounded by at least one wall comprising a hydrogen permeable membrane configured to permit hydrogen gas to pass through the respective wall;
at least a first hydrogen gas outlet configured to pass hydrogen gas from the housing;
a reaction chamber;
a fuel conduit capable of conveying fuel from the fuel storage area to the reaction chamber;
a discharged fuel conduit capable of conveying discharged fuel and hydrogen gas from the reaction chamber to the hydrogen separation area; and
further comprising a space between at least one of the areas and the housing, wherein the space is capable of containing hydrogen gas from both of the respective areas before the gas passes through the hydrogen gas outlet.

31. The hydrogen generator of claim 30, wherein each of the areas is bounded by a flexible bag.

32. The hydrogen generator of claim 30, wherein the respective areas are located side by side within the housing.

33. The hydrogen generator of claim 30, wherein the respective areas are separated by a movable partition within the housing.

34. The hydrogen gas generator of claim 30, further comprising a second hydrogen gas outlet.

* * * * *